J. P. NORWOOD.
BREAD WRAPPING, LABELING, AND SEALING MACHINE.
APPLICATION FILED JULY 1, 1913.

1,191,029.

Patented July 11, 1916.
8 SHEETS—SHEET 1.

UNITED STATES PATENT OFFICE.

JAMES P. NORWOOD, OF GARY, INDIANA.

BREAD WRAPPING, LABELING, AND SEALING MACHINE.

1,191,029.    Specification of Letters Patent.    Patented July 11, 1916.

Application filed July 1, 1913. Serial No. 776,848.

*To all whom it may concern:*

Be it known that I, JAMES P. NORWOOD, citizen of the United States, residing at Gary, in the county of Lake and State of Indiana, have invented certain new and useful Improvements in Bread Wrapping, Labeling, and Sealing Machines, of which the following is a specification.

This invention relates to an improved bread wrapping sealing and labeling machine.

The primary object of the invention contemplates the provision of means including specially devised automatically operated mechanism whereby each loaf of bread is separately wrapped, sealed and labeled, in the order named, and finally delivered in a sanitary marketable condition into a suitable receptacle provided therefor.

A further object of the invention resides in the provision of means including an endless conveyer having a plurality of uniformly spaced apart carriers arranged thereupon, each carrier adapted to receive a single loaf of bread and automatically shift or handle the same in such a novel and peculiar manner as to effect the entire wrapping, sealing and labeling operation, this being accomplished through the medium of specially arranged mechanism to be hereinafter fully described.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
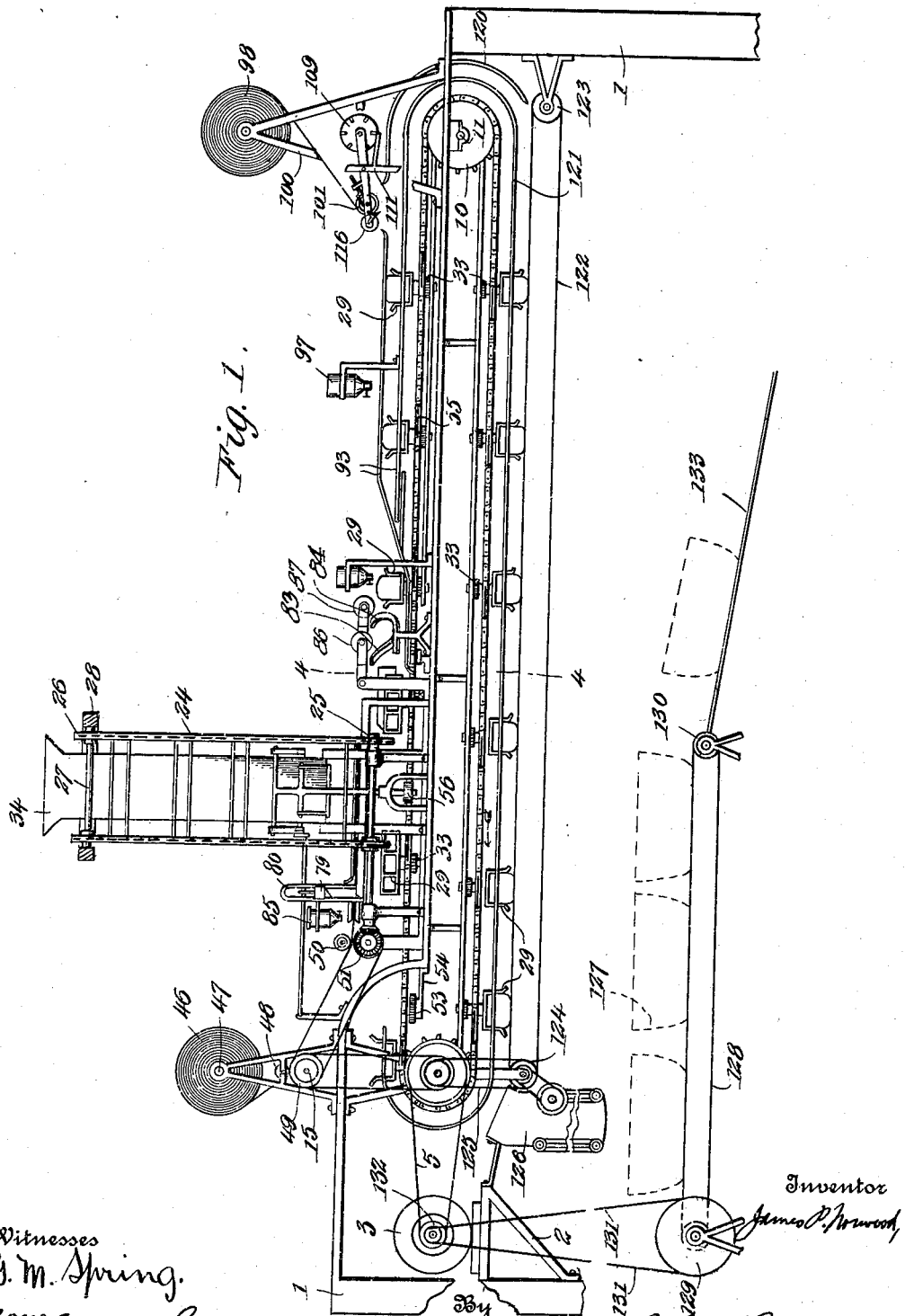
Figure 2:
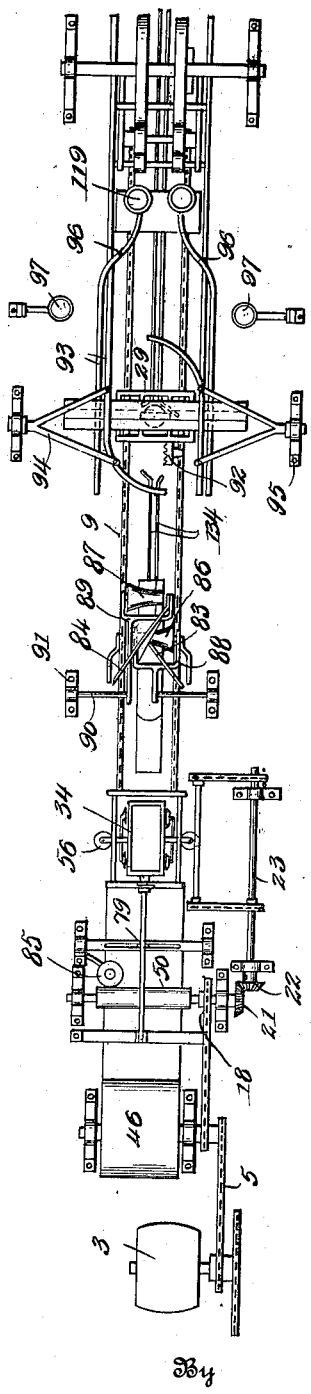
Figure 3:
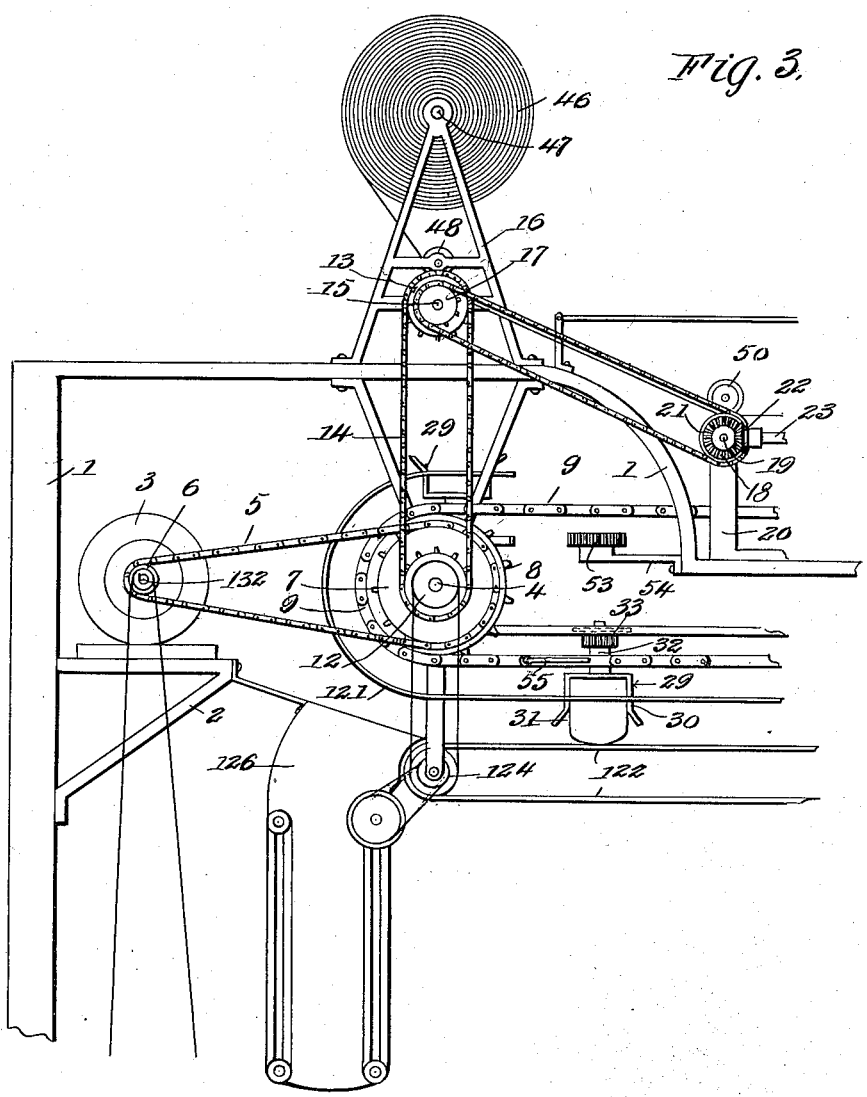
Figure 4:
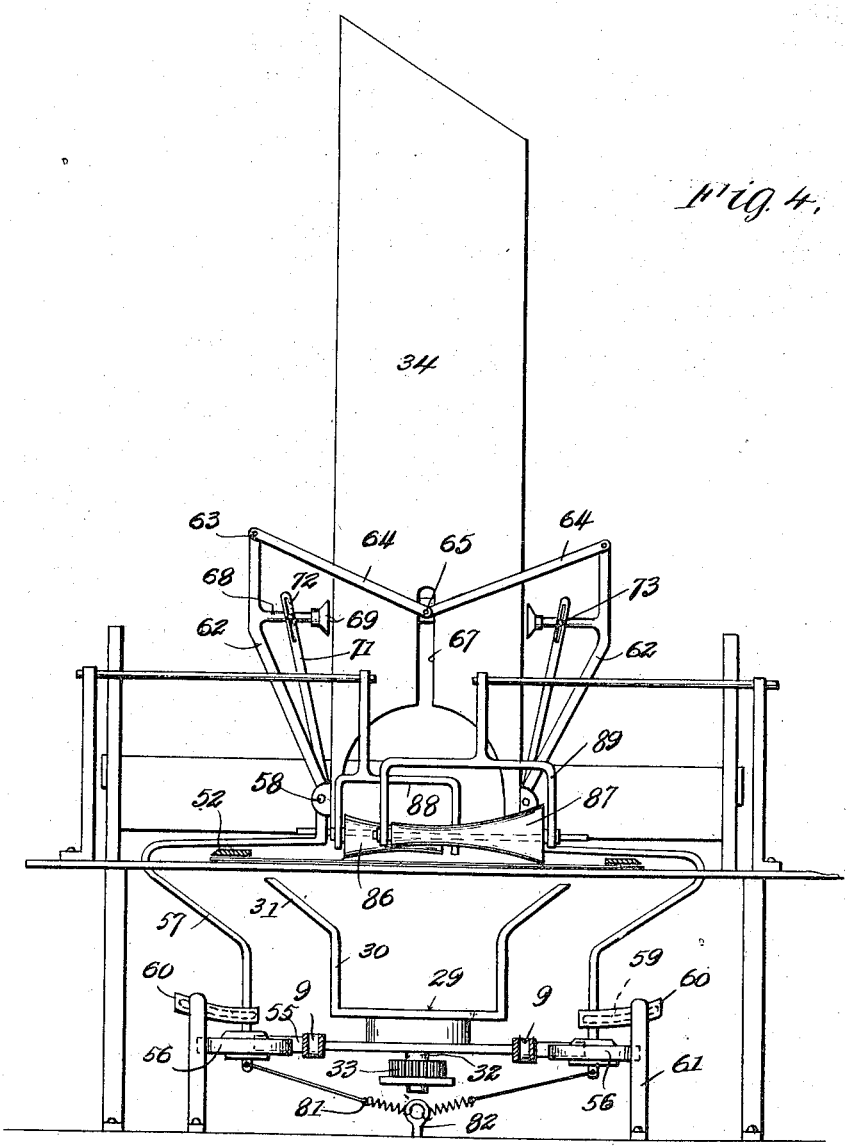
Figure 5:
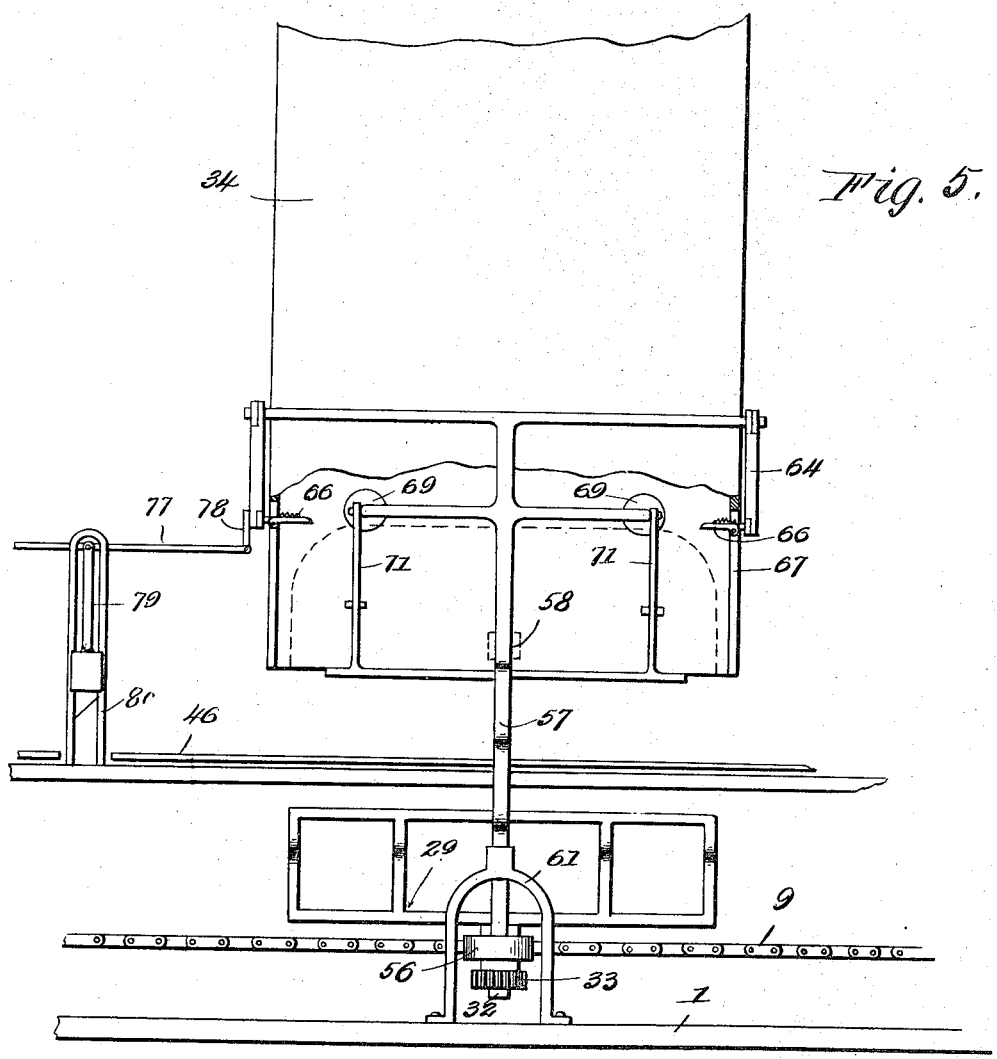
Figure 6:
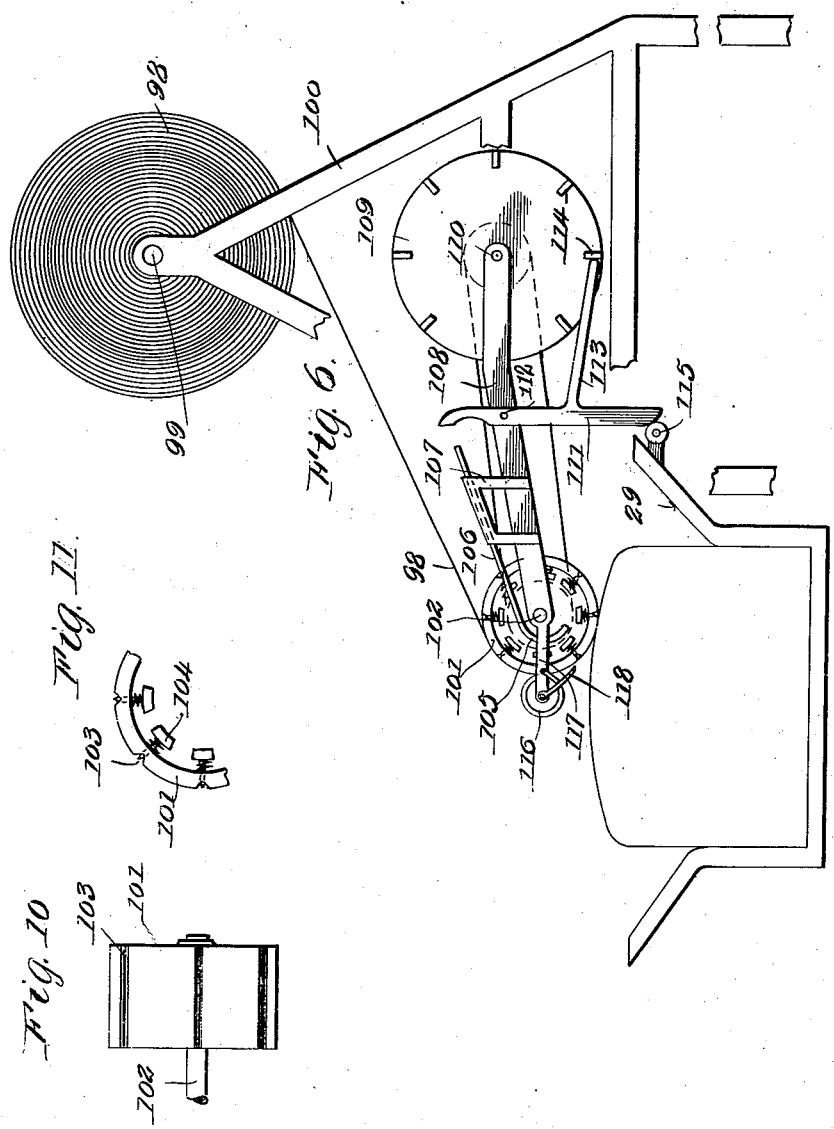
Figure 7:
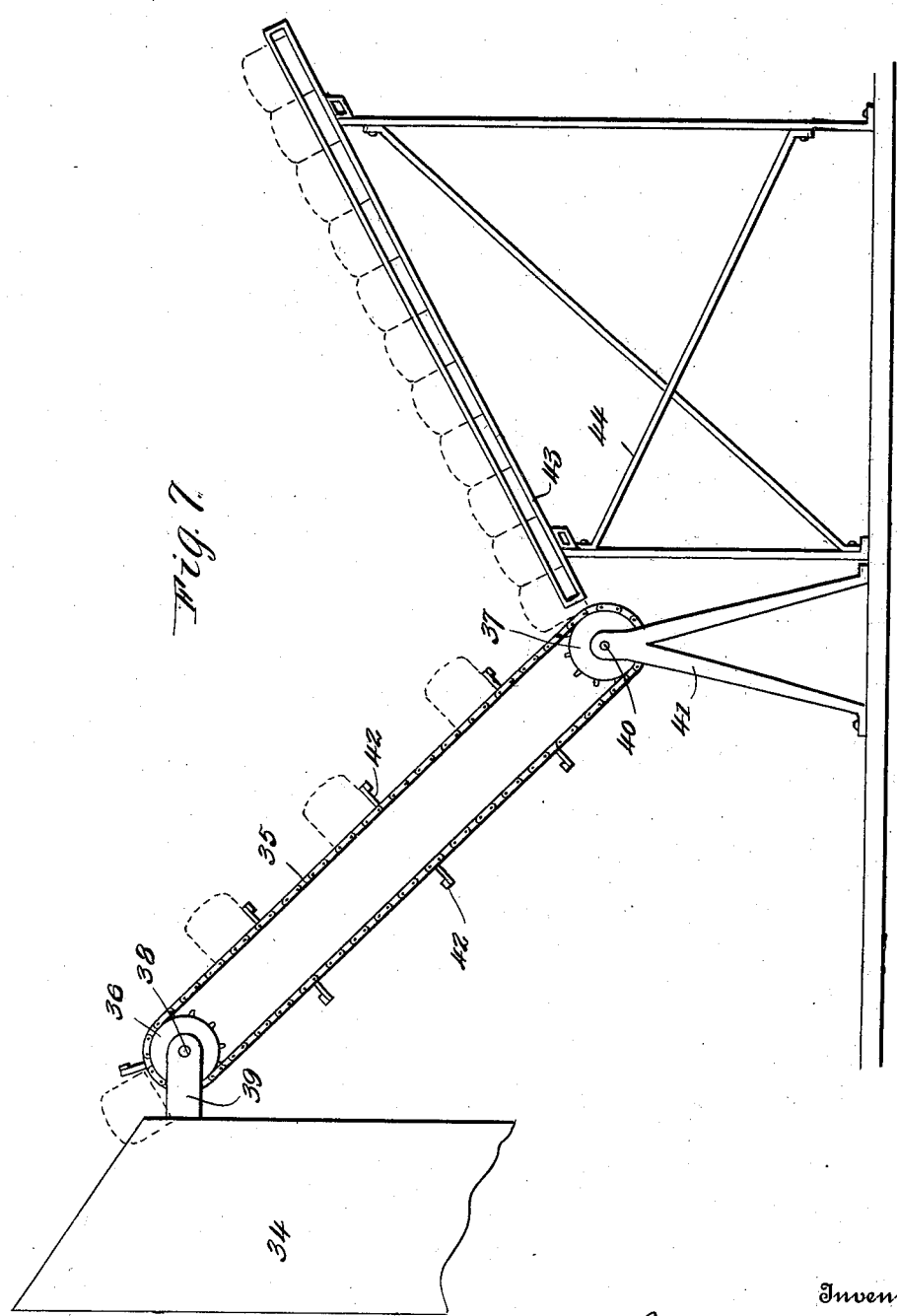
Figure 8:
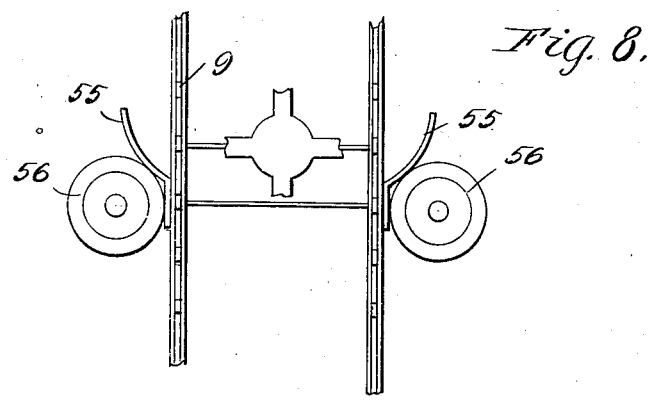
Figure 9:
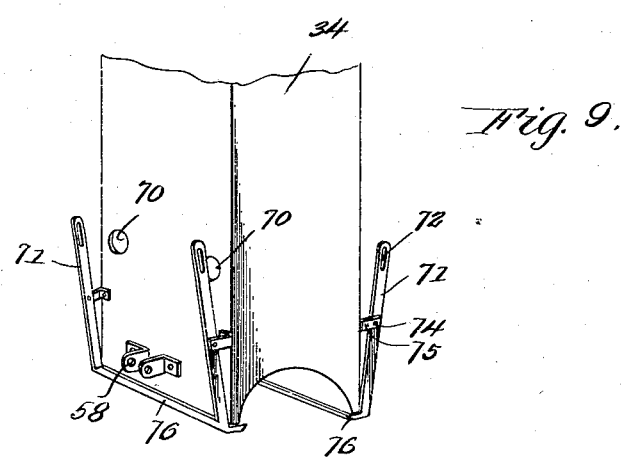

Figure 1 is a side elevation, parts being broken away, of a machine constructed in accordance with my invention; Fig. 2 is a top plan view, one end of the machine not being shown; Fig. 3 is an enlarged side elevation of a portion of the machine; Fig. 4 is an enlarged cross sectional view on the line 4—4 of Fig. 1; Fig. 5 is an enlarged elevation, partly broken away of the means employed for forcing the bread into the carrier, Fig. 6 is an enlarged elevation of the labeling mechanism; Fig. 7 is an elevation illustrating the means employed for conveying the bread to the hopper; Fig. 8 is a detail top plan view of a portion of the main conveyer; Fig. 9 is a detail perspective view illustrating the arrangement of certain of the levers with respect to the hopper; Fig. 10 is a side elevation of the rotary label cutting device; and Fig. 11 is a detail fragmentary view of a portion of the said cutting device.

Referring now to the drawings, wherein is illustrated the preferred form of my invention the numeral 1 designates the main frame or supporting structure upon which the machine comprising my invention is mounted for operation, the said frame having a shelf or support 2 secured thereto upon which an electric or other motor 3 is seated, the latter being connected to the driven shaft 4 of the machine through the medium of a sprocket chain 5, one end of which is arranged over a suitable sprocket wheel 6 mounted upon the shaft of the motor 3 and the other end over a sprocket wheel 7 keyed or otherwise fixedly secured to the driven shaft 4. A second sprocket wheel 8 is mounted for rotation upon the driven shaft 4 over which the main conveyer 9 of my invention is arranged, the said conveyer extending to a duplicate sprocket wheel 10 disposed in spaced relation thereto and mounted upon a shaft 11 extending parallel with the driven shaft 4, the said shaft being journaled within bearings provided therefor depending from the main frame or supporting structure 1. A third and smaller sprocket wheel 12 is mounted for rotation upon the driven shaft 4 and connected to a similar wheel 13 by means of a chain 14, the latter sprocket wheel being mounted for rotation upon a shaft 15 journaled within bearings formed upon a suitable upright 16 mounted upon the supporting structure 1. Likewise mounted upon the shaft 15 is another sprocket 17 adapted to be connected to a sprocket wheel 18 mounted upon a shaft 19 journaled within arms 20 of the main frame, the latter shaft having a beveled gear 21 secured thereto which is adapted to mesh into a beveled pinion 22 mounted upon a shaft 23 extending at right angles to the shaft 19 above mentioned, the latter shaft 23 imparting motion to a vertically extending conveyer 24 arranged at one end over the sprocket wheels 25 mounted upon the said shaft 23 and at the opposite end over similar wheels 26 mounted upon a shaft 27 provided therefor and journaled within an extension 28 of the frame.

Carriers, designated in their entirety by the numeral 29 are mounted for rotation upon the main conveyer 9 of the machine, the carriers comprising a pair of spaced apart carrier arms 30 having flared extensions 31 formed integrally therewith and a centrally disposed stub shaft 32 secured thereto, the latter carrying a pinion 33 the purpose of which will subsequently appear.

A hopper 34 supported in any suitable manner by the frame extension 28 is disposed directly over and above the main conveyer 9 of the machine, into which the loaves of bread to be acted upon are deposited through the medium of an endless conveyer 35 arranged over sprocket wheels 36 and 37, the former being mounted upon a shaft 38 journaled within arms 39 extending laterally from the hopper 34 at the upper end thereof and the latter to a shaft 40 mounted for rotation and having a bracket 41 provided therefor. Uniformly spaced apart projections 42 are secured to the conveyer 35 and are adapted to catch and support the loaves of bread as they are delivered or fed to the said conveyer, the loaves before reaching the conveyer being supported upon an inclined guide 43 disposed adjacent the bracket 41 and supported by means of a suitable frame 44 secured thereto.

Wrapping paper 46 wound upon a shaft 47 is supported over and above the shaft 15 above mentioned, the shaft 47 being journaled within the upright frame portion 16. The free end of the paper 46 is passed between rollers 48 and 49 mounted upon the said upright frame portion 16 from which point it extends to and between rollers 50 and 51 mounted for rotation upon the arms 29 within which the shaft 19 is journaled. From the rollers 50 and 51, the paper extends between guides 52 beneath the mouth of the hopper 34, from which the bread acted upon, is forced in a manner to be hereinafter fully described. By extending the paper 46 directly beneath the mouth of the hopper 34 it will be seen that the bread as it is discharged therefrom is adapted to come or fall into engagement with the said paper, and as the latter is disposed directly over the carrier 29 mounted for operation upon the main conveyer 9, the weight of the bread with the assistance of other mechanism to be subsequently mentioned will force the same into and between the arms 30 of the said carrier, the said arms in their flared extremities 31 folding the paper upon two sides and the bottom of the bread.

The carriers 29 normally extend transversely of the conveyer 9. As the pinion 33 of the carrier comes into engagement with or meshes into a pinion 53 mounted for rotation upon a bracket 54 carried by the main frame 1, the pinion 33 of the carrier is partially turned or rotated thereby shifting the carriers to extend parallel with the conveyer 9. As the conveyer moves in the direction indicated by the arrow in Fig. 1, projections 55 secured to the said conveyer are forced into engagement with idlers 56, the latter being mounted for rotation upon arms 57 pivotally secured as at 58 to the hopper 34. The arms 57 extend through an arcuate slot 59 formed within a guide strip 60 supported by uprights 61 secured to the frame, this arrangement allowing the said arms 57 to move outwardly or away from the main conveyer 9 during the engagement between the projections 55 and the idlers 56. As the idlers 56 are forced apart, the arms 57 by reason of their pivotal support are forced outwardly causing the upper portion of the said arms designated by the numeral 62 to move inwardly, and as the latter has pivotally secured thereto as at 63 levers 64, which are in turn pivotally secured as at 65 to suitable trips 66 which extend through a slot 67 formed within the conveyer, it will be seen that the said trips 66 are moved downwardly, and as the said trips engage the bread within the hopper, the bread is likewise moved downwardly and forced or discharged from the mouth of the hopper onto the paper 46 as above described. Arms 68 project inwardly from the arms 62 and terminate in disks 69 which are adapted to pass through openings 70 formed within the hopper so as to engage the next or adjacent loaf of bread and support the same within the hopper while the discharged loaf is being acted upon. A slotted lever 71, the slot 72 of which is arranged over a pin 73 carried by the arm 68, is pivotally secured as at 74 to brackets 75 projecting laterally from the hopper, the levers 71 being connected at their lower extremity through the medium of a cross piece 76 adapted to fit or extend inwardly beneath the mouth of the hopper, the extended portion engaging the bread and, with the disk 69 supporting the same in the desired manner.

Another lever 77 is pivotally secured to a link 78 in turn pivotally secured to the trip 66, the said lever 77 extending to a vertically slidable cutting member, designated in its entirety by the numeral 79, this arrangement of the cutting member or knife with respect to the trip 66 causing the said knife to move vertically within a guide 80 provided therefor, and to sever or cut the paper 46 at a predetermined length during each operation of the idlers 56. Spring arms 81 connect the arms 57 to an eye 82 supported by the frame 1, this connection returning the said arms to their normal position after the projections 55 are withdrawn from engagement with the idlers 56.

The bread having been deposited and forced into the carrier 29 of the conveyer 9, the latter in its continued movement conveys the bread within the carrier, which is still parallel with the said conveyer 9, until one of the projecting edges of the paper engages a strip 83 disposed in the path thereof, the said strip being placed at an angle to force the paper over and upon the top of the bread, after which operation the unfolded portion of the paper upon the opposite side of the loaf is brought into engagement with a like angularly disposed strip 84 which likewise forces the paper 46 over and upon the already folded portion above mentioned, and, as the said portion last folded is coated with an adhesive substance applied thereto from a mucilage cup 85 disposed in the path of the paper 46, it will be seen that the two last folded portions of the paper are sealed and the bread loaf exposed only at the ends thereof. A substantially cone-shaped roller 86 is adapted to engage the first folded portion of the paper for retaining the same in folded position while the other portion thereof is being folded thereupon, the latter when folded being engaged by a second roller 87 adapted to gently yet firmly press the two folded portions together thereby tightly sealing or fastening the said folded portions together. Substantially U-shaped brackets 88 and 89 respectively are provided for the rollers 86 and 87, the said brackets being supported by means of rods 90 extending inwardly from brackets 91 disposed in spaced relation, one upon each side of the conveyer 9.

The continued movement of the conveyer 9 causes the pinion 33 of the carrier to move into mesh or engagement with a rack bar 92 disposed in the path thereof, such engagement causing the carrier to again assume its normal position and to extend transversely of the conveyer 9. As the carrier 29 is turned or rotated, the extended or unfolded portion of the paper or wrapper is forced between guide strips 93 provided therefor upon each side thereof, the said strips being supported by means of arms 94 mounted within brackets 95 secured to the main frame 1 of the machine. The wrapper having been fitted between the guides 93, a continued movement of the conveyer will force the unfolded portions of the wrapper into engagement with the curved extremities 96 of the upper of the said guides, this engagement between the wrapper and the strips causing the latter to be forced inwardly and over the ends of the bread loaf, the said ends being previously forced beneath mucilage cups 97 which apply adhesive material thereto, thereby conditioning the same to be sealed automatically when the curved extremities 96 of the guides 93 force the same over and upon one another.

The bread having been wrapped and sealed in the manner above set forth, it now remains to apply the labels thereto. For this reason a roll of labels 98 is provided the labels being wound upon a shaft 99 journaled within an upright frame portion 100 supported by the main frame 1. The free end of the labels 98, the same being printed upon a single sheet of uncut paper, extends over the periphery of a rotary cutting member 101, the latter being mounted upon a shaft 102 disposed directly over the conveyer 9. The rotary cutting member 101 is provided with a plurality of uniformly spaced apart spring actuated cutting blades 103, each of which terminates at its inner extremity in a head 104 adapted to be engaged by the curved extremity 105 of a reciprocatory arm 106 mounted within a bracket 107 extending upwardly from a stationary supporting frame portion 108, the latter having an escapement 109 mounted thereof through the medium of a shaft 110 mounted for rotation between the said frame portions 108. A lever 111 is pivotally secured as at 112 to the frame portion 108 and is provided with a rearwardly extending arm 113 adapted to engage one of a plurality of projections 114 formed upon the faces of the escapement 109, this arrangement of the said pivoted lever with respect to the escapement adapted to partially rotate the latter according to the movement of the said arm 113.

The carrier 29 as it travels along the conveyer 9 is adapted to engage the lever 111, a roller 115 being carried or mounted upon the carrier 29 for this purpose, the movement of the lever 111 causing the same to be forced into engagement with the reciprocatory arm 106, thus forcing the said rod forwardly and causing the curved extremities 105 thereof to engage one of the spring actuated knives or blades 103. A roller is journaled within an extension 117 of the frame portion 108 and provided with a trigger arm 118 adapted to normally engage the label sheet 98 as the same is passed between the said roller and the rotary knife 101. The arrangement of the roller with respect to the rotary knife causes the label sheet, by reason of the engagement between the said rotary knife and the bread acted upon, to revolve or rotate, and as the arm 111 is engaged by the roller 115 of the carrier, the rod 106 is operated and the label cut by reason of its engagement with one of the spring actuated knives 103. Mucilage containers or receptacles 119 are disposed in the path of the carrier 29 for applying and spreading adhesive substance upon the outer face of the bread wrapper thus causing the labels subsequently applied thereto to be permanently sealed or fastened upon the exterior of the wrapper.

To allow the wrapper as well as the labels to dry before removing the bread loaves from the machine, a supporting strip 120 is provided, the said strip being arranged over the extremity of the conveyer 9 in spaced relation thereto, thus firmly holding the wrapper and the label thereon in engagement with that portion to which it is to be sealed, a second supporting strip 121 being disposed at the sides of the conveyer for holding the ends of the wrapper firmly against that portion to which they are to be sealed in the same manner as the strip 120. A belt 122 is arranged over pulleys 123 and 124 respectively directly beneath the conveyer 9 for supporting the loaves within the carriers 29 during their travel from the sprocket 10 toward the sprocket 8, motion being imparted to the pulley 124 through the medium of a belt 125 connected to the driven shaft 4 as illustrated in Fig. 1 of the drawings. A receptacle 126 is disposed at one end of the belt 122 into which the wrapped loaves of bread are deposited or discharged after leaving the carriers 29 of the main conveyer, the said receptacle discharging or guiding the bread into containers 127 provided therefor, the said containers being supported upon a driven belt 128 arranged over pulleys 129 and 130 respectively, the former being driven by a belt 131 one end of which is driven by the motor shaft through the medium of a pulley 132. From the belt 128, the containers 127 are conveyed to an inclined support 133 where they are either removed or carried away in any desired manner.

Guide strips 134 are arranged beneath the conveyer 9 within which and between which the stub shaft 32 of the carrier is interposed, this arrangement causing the said carrier to move along the said conveyer as occasion demands.

Having described fully the construction of my device, it now remains to set forth a little more in detail the operation thereof. The unwrapped loaves of bread are first placed upon the inclined guide way 43 where they are automatically fed to the conveyer 35 and thence into the hopper 34 of the machine. When within the hopper, the bread is fed by gravity and by the coöperation of the mechanism illustrated in Figs. 4 and 5 of the drawings to the wrapper 46 provided therefor, and thence to the carriers 29 where they are conveyed or moved by the conveyer 9 to be folded by the means provided for that purpose during the travel of the bread over the conveyer. After sealing the wrapped bread, the labels are applied by the operation of the mechanism illustrated to advantage in Fig. 6 of the drawings, thereby completing the operation of the machine and allowing the bread to be discharged therefrom to the containers 127 in a tightly wrapped, sealed and labeled condition.

It will be seen from the above, taken in connection with the accompanying drawings that the several embodiments comprising my invention are so arranged with respect to one another as to operate automatically and in the desired manner; that the carriers are automatically rotated upon the conveyer 9 for effecting the wrapping of the bread carried thereby; and that the entire machine is driven from one source of motive power embodied in the motor designated by the numeral 3.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a bread wrapping machine, a plurality of horizontally traveling carriers, mechanism operating to deliver loaves of bread singly to the carriers, each loaf of bread being partially wrapped during such delivery, means to rotate the carrier while traveling, and means to complete the wrapping operation by the mentioned rotation.

2. In a bread wrapping machine, an endless conveyer, a plurality of carriers mounted on the conveyer, mechanism to deliver loaves of bread singly to the carriers, each loaf of bread being partially wrapped during its delivery, and strips arranged to traverse the conveyer and to engage the partially wrapped loaves of bread, the strips operating automatically during continued movement of the carriers to complete the wrapping operation.

3. In a bread wrapping machine, an endless conveyer operating in a substantially horizontal plane, a plurality of carriers mounted on the conveyer, each carrier being individually rotatable with its axis of rotation extending vertically, mechanism to deliver loaves of bread singly to the carriers, each loaf of bread being partially wrapped during its delivery, means arranged in the path of movement of the partially wrapped bread to rotate the carriers, and means including a pair of wrapper-engaging strips arranged to extend at an angle across the conveyer to complete the wrapping operation during continued movement of the carriers.

4. A bread wrapping machine including an endless conveyer, a plurality of carriers movable therewith, means for automatically supplying wrapping material over said carriers, means for automatically feeding the bread, one loaf at a time, on to the said material and within the said carriers, the bread feeding operation being controlled by movement of said conveyer, means for varying the position of the carriers at predetermined intervals with respect to the said conveyer and means disposed in the path of movement of said carriers for folding said material upon the said bread, as and for the purpose set forth.

5. In a bread wrapping machine, a plurality of traveling carriers, means to deliver loaves of bread singly to the carriers, each loaf of bread being partially wrapped during its delivery, strips arranged to traverse the carriers for folding the wrapping material upon the top of the loaves of bread, means applying adhesive substance to the wrapping material immediately previous to the folding operation aforesaid, and a roller operating in conjunction with each folding strip to press the wrapper subsequent to folding, as and for the purpose set forth.

6. In a bread wrapping machine, a plurality of movable carriers, means operating to deliver loaves of bread singly to the carriers, each loaf of bread being partially wrapped during its delivery, means engaging the partially folded loaves of bread to complete the folding operation, and rollers disposed for engagement with the completely wrapped bread to insure sealing thereof.

7. In a bread wrapping machine, an endless conveyer, a plurality of carriers movable with the conveyer, each carrier being individually rotatable with its axis of rotation extending vertically, means to deliver a loaf of bread to each carrier and to partially wrap such loaf during delivery, guide means directing movement of the carriers, means disposed in the path of movement of said carriers to effect rotation, and means to complete the wrapping operation while rotating.

8. In a bread wrapping machine, a plurality of individually rotatable carriers, means operating to deliver loaves of bread singly to the carriers, each loaf of bread being partially wrapped during its delivery, strips extending at an angle across the top of the carriers to assist in the wrapping operation, means to rotate the carriers, and means operating to complete the wrapping of the bread subsequent to the rotation of the carriers, as and for the purpose set forth.

9. A bread wrapping machine including an endless conveyer, carriers arranged thereupon, means for shifting the carriers into various positions during the movement of the conveyer, uniformly spaced apart projections secured to the conveyer upon each side thereof, a hopper disposed directly over the said conveyer, arms pivotally secured to the said hopper, the said arms adapted to depend, one upon each side of the said conveyer, idlers mounted for rotation upon the said arms adapted to be engaged by the said projections, means for guiding the said arms during their movement effected by the engagement between the said projections and the said idlers, and means including a plurality of levers adapted to be operated according to the movement of the said arms for automatically feeding the bread, one loaf at a time, from the hopper on to the carriers.

10. A bread wrapping machine including an endless conveyer, carriers arranged thereupon, a stub shaft upon which the said carriers are mounted for rotation, a pinion mounted upon the said shaft, a pinion disposed in the path of the said first mentioned pinion adapted to rotate the latter for shifting the carriers into various positions during the travel of the conveyer, projections secured to the conveyer upon each side thereof, a hopper disposed directly over the said conveyer, arms pivotally secured to the said hopper adapted to depend, one upon each side of the conveyer, idlers mounted for rotation upon the said arms adapted to be engaged by the said projections for spreading the arms during such engagement, guides disposed adjacent the conveyer adapted to limit the movement of the arms during the spreading thereof, means for returning the arms to their normal position when disengaged by the said projections, and means including a plurality of levers adapted to be operated by the said arms for automatically feeding the bread, one loaf at a time, from the said hopper on to the said carriers.

11. A bread wrapping machine including an endless conveyer, carriers movable with said conveyer, a hopper disposed directly over the path of movement of said conveyer, projections secured to the said conveyer, one projection upon each side of each carrier, arms pivoted to said hopper, idlers rotatably mounted upon one extremity of the arms adapted to be disposed in the path of movement of the said projections, and means operated by actuation of said arms to automatically feed the bread within the hopper, one loaf at a time on to the said carriers.

12. In a bread wrapping machine, the combination of an endless conveyer having a plurality of uniformly spaced apart carriers arranged thereupon, a hopper disposed directly over the said conveyer, means for automatically feeding the wrapping material between the said hopper and the said conveyer, means operated by the said conveyer adapted to automatically feed the bread, one loaf at a time from the said hopper on to the said material and into the carriers, and means including a pair of angular strips disposed adjacent the said conveyer, adapted to force the material over the bread, as and for the purpose set forth.

13. In a bread wrapping machine, the combination of an endless conveyer, a plurality of uniformly spaced apart carriers mounted for rotation thereon, a hopper disposed directly over the said conveyer, means for automatically feeding the wrapping material between the said hopper and the said conveyer, means operated by the said conveyer adapted to automatically feed the bread, one loaf at a time on to the paper and into the carriers, angularly disposed strips arranged adjacent the said conveyer and in the path of the said carrier, the said strips adapted to fold the material over the bread when within the carriers, and means including rollers disposed over the said conveyer adapted to seal the material when folded, as and for the purpose set forth.

14. In a bread wrapping machine, the combination of an endless conveyer, a plurality of uniformly spaced apart carriers mounted for rotation thereon, means for rotating the carriers at predetermined points during the travel of the said conveyer, a hopper disposed directly over the said conveyer, means for automatically feeding the wrapping material between the said hopper and the said conveyer, means for automatically forcing the bread, one loaf at a time, from the said hopper on to the material and into the carriers, means operated by the carriers adapted to simultaneously cut the material during the forcing of the bread into the carriers, and means including a pair of angularly disposed strips arranged adjacent the conveyer and in the path of the carriers adapted to fold the material over and upon the bread, as and for the purpose set forth.

15. In a bread wrapping machine, the combination of an endless conveyer, a plurality of uniformly spaced apart carriers mounted for rotation thereupon, means for automatically feeding the bread, one loaf at a time into the said carriers, means for automatically folding the wrapping material partly over the bread during the forcing of the same into the carriers, angularly disposed strips arranged adjacent the conveyer adapted to fold the material over the top of the bread, and means including guide strips arranged adjacent the said conveyer adapted to fold the material over the ends of the bread, as and for the purpose set forth.

16. In a bread wrapping machine, the combination of an endless conveyer, a plurality of uniformly spaced apart carriers mounted for rotation thereupon, wrapping material adapted to be disposed directly over the said carriers, means for automatically forcing the bread, one loaf at a time on to the wrapping material and into the carriers, such forcing of the bread into the carriers adapted to fold the material over the bottom and sides of the bread, angularly disposed strips arranged one upon each side of the conveyer adapted to project into the path of the said carriers, the said strips adapted to engage the material for folding the same over and upon the top of the bread, oppositely disposed strips arranged adjacent the conveyer adapted to fold the material over the ends of the bread and automatically operated means for sealing the material in folded position, as and for the purpose set forth.

17. In a bread wrapping machine, the combination of an endless conveyer, a plurality of uniformly spaced apart carriers mounted for rotation upon the said conveyer, wrapping material adapted to be fed directly over the said carriers, means for automatically forcing the bread, one loaf at a time on to the said material and into the carriers, the forcing of the bread into the carriers adapted to fold the material upon the bottom and sides of the bread, angularly disposed strips arranged adjacent the conveyer and adapted to extend to the path of the carrier for folding the material upon the top of the bread during the movement of the conveyer, oppositely disposed strips adapted to fold the material upon the ends of the bread during the travel of the conveyer, and automatic means for sealing the material, as and for the purpose set forth.

18. In a bread wrapping machine, the combination of an endless conveyer, a plurality of uniformly spaced apart carriers arranged thereupon, means for automatically feeding the bread, one loaf at a time into the carriers, means for partially wrapping the bread during the feeding of the same into the said carriers, oppositely disposed angular strips arranged adjacent the conveyer in the path of the said carriers, the said strips adapted to engage the wrapping material for folding the same over and upon the top of the bread, and a pair of conical rollers disposed adjacent the said strips adapted to engage the material when folded for automatically sealing the same, as and for the purpose set forth.

19. In a bread wrapping machine, the combination of an endless conveyer having a plurality of carriers arranged thereupon, means for automatically feeding the bread, one loaf at a time into the said carriers, the feeding of the bread into the carriers adapted to wrap the same upon the bottom and sides thereof, oppositely disposed angular strips arranged adjacent the conveyer in the path of the carriers adapted to fold the wrapper upon the top of the bread, means for sealing the wrapper over the top of the bread, guide strips disposed adjacent the conveyer upon each side thereof, the said strips adapted to engage the wrapper for folding the same over the ends of the bread, and means for automatically sealing the ends of the wrapper when folded upon the bread, as and for the purpose set forth.

20. In a bread wrapping machine, the combination of an endless conveyer, a plurality of uniformly spaced apart carriers arranged thereupon, a stub shaft upon which the said carriers are mounted for rotation, arms forming sides for the said carriers adapted to fold the bread wrapper upon the sides of the bread as the same is forced into the carrier, and means including a pinion carried by the said shaft adapted to shift the carrier into various positions during the travel of the conveyer.

21. In a bread machine, the combination of an endless conveyer, a plurality of uniformly spaced apart carriers arranged thereupon, means for rotating the carriers at predetermined points during the travel of the said conveyer, means for automatically feeding the bread, one loaf at a time into the carriers, the feeding of the bread into the carriers adapted to fold the wrapping material upon the bottom and sides of the bread, strips disposed adjacent the conveyer adapted to fold the material over and upon the top of the bread, guide strips disposed upon each side of the conveyer adapted to fold the wrapper over the ends of the bread, and means for automatically sealing the wrapper when in folded position, as and for the purpose set forth.

22. A bread wrapping machine including an endless conveyer, carriers movable with said conveyer, projections secured to the carrier, one upon each side of each carrier, a hopper disposed directly over the path of movement of said conveyer, arms pivotally secured to the hopper, said arms depending one upon each side of the conveyer, an idler mounted for rotation upon the free end of each arm, the said idlers being disposed in the path of movement of said projections, and trip mechanism operated by the said arms for automatically feeding the bread, one loaf at a time, from the hopper on to the said carriers.

23. In a bread wrapping machine, a movable support, means to move the support, means to deliver the bread onto the support, means to partially wrap the bread incident to its delivery, means to rotate the support while moving, means to continue the wrapping operation while rotating, and means to complete the wrapping operation subsequent to rotation.

24. A bread wrapping machine including an endless conveyer, a plurality of rotatable carriers movable with said conveyer, means for supplying wrapping material over the carriers, means for feeding loaves of bread, one loaf at a time on to the wrapping material and into the carriers, said loaves of bread being partially wrapped by reason of the engagement of the said material with the said carrier, means disposed in the path of movement of said carriers for rotating the same at predetermined intervals after receiving the bread, and means disposed in the path of movement of said carriers to continue the folding of the wrapper upon the said bread, as and for the purpose set forth.

25. In a bread wrapping machine, a movable carrier for the bread to be wrapped, means to move the carrier, means to partially wrap the bread incident to its engagement with the carrier, means to rotate the carrier in one direction, means engaging the wrapper during rotation of the carrier to continue its wrapping operation, means to reversely rotate the carrier, and means engaging the wrapper during such reverse rotation of the carrier to complete the wrapping operation.

26. A bread wrapping machine including an endless conveyer, a plurality of carriers rotatable with respect to said conveyer, said carriers being movable therewith, means for supplying wrapping material over the carriers, means for feeding loaves of bread, one loaf at a time on to the said material and into the carriers, each loaf of bread being folded upon the bottom and sides thereof by reason of the engagement between the material and the said carriers, means disposed in the path of movement of the said carriers for rotating the same at predetermined intervals, angular strips disposed in the path of movement of the carriers for folding the material upon the top of the bread, and means disposed in the path of movement of the carriers for folding the material over the ends of the bread, as and for the purpose set forth.

27. In a bread wrapping machine, mechanism operating to wrap loaves of bread, the wrapping material covering the top, bottom and sides thereof, means moving the bread during a wrapping operation, and oppositely curved strips adapted for engagement with the wrapping material extending beyond the ends of the bread during a wrapping operation to fold said extended portions of the wrapper over the ends of the bread and upon the top thereof, as and for the purpose set forth.

28. In a bread wrapping machine, a plurality of movable carriers, means for feeding loaves of bread, one loaf of bread at a time into the carriers, means for supplying wrapping material to each loaf of bread, means disposed in the path of movement of said carrier for folding the material upon the top, bottom and sides thereof, and means including a plurality of strips arranged in pairs, one pair upon each side of the path of movement of said carriers, between the pairs of which the material is forced, one of the strips of each pair being curved to fold the material, by a continued movement of the carriers, over and upon the ends of the bread, as and for the purpose set forth.

29. A bread wrapping machine including a plurality of rotatable bodily movable carriers, means for feeding loaves of bread, one loaf of bread at a time to the said carriers, means for supplying wrapping material over the said carriers, each loaf of bread being automatically folded upon the bottom and sides thereof during the feeding of the bread on to the material into the carriers, a pair of angular strips disposed one upon each side of the path of movement of said carriers, means for partially rotating said carriers at predetermined intervals throughout their path of movement, the said strips being disposed to engage the material to fold the same over and upon the top of the bread, and means actuatable after rotation of the carriers to fold the material over and upon the ends of the bread, as and for the purpose set forth.

30. In a bread wrapping machine, mechanism to wrap loaves of bread, the wrapping material covering the bottom, ends and sides of the loaf, means to apply adhesive substance to the wrapper, means to fold the wrapper over and upon the top of the bread, and a plurality of rollers engageable with the wrapper subsequent to the folding operation aforesaid for sealing the wrapper in its folded position.

31. In a bread wrapping machine, an endless conveyer, carriers movable with said conveyer, means actuatable by movement of said conveyer for supplying loaves of bread in partially wrapped condition, one loaf at a time to the said carriers, a pair of angularly disposed strips arranged in the path of movement of said carriers, said strips being adapted for engagement with the wrapping material to fold the said material over and upon the top of the bread, means for supplying adhesive substance to the material previous to its engagement with said strips, and means including a pair of rollers disposed in the path of movement of said carriers engageable with said material to seal the same after folding operation, as and for the purpose set forth.

32. In a bread wrapping machine, a plurality of rotatable bodily movable carriers, means for supplying loaves of bread in partially wrapped condition, one loaf of bread at a time to the said carriers, means disposed in the path of movement of said carriers to impart rotary movement thereto, strips arranged in pairs, one pair of strips upon each side of the path of movement of said carriers, the said strips being curved to guide the wrapping material during rotation of the carriers therebetween, and means operable by a continued movement of the carriers for folding the material over and upon the ends of the bread, as and for the purpose set forth.

33. In a bread wrapping machine, a plurality of individually rotatable carriers, means to deliver a loaf of bread to the carriers, the bread being partially wrapped during its delivery, means arranged in the path of movement of the carrier to rotate it, and means engaging the wrapper during rotation of the carrier to fold it over the ends of the loaf.

34. In a bread wrapping machine, a movable carrier, mechanism operating to deliver a loaf of bread to the carrier, mechanism operating to partially wrap the bread during its movement within the carrier, means disposed in the path of movement of the carrier to partially rotate it, and means including a pair of oppositely curved strips adapted for engagement with the wrapper to fold it over the ends of the loaf.

35. In a bread wrapping machine, a movable carrier, means to deliver a loaf of bread to the carrier, means operating to partially wrap the bread during its delivery, means operating to further wrap the bread during its movement, and means including a pair of oppositely curved strips to completely wrap the bread, the said strips being directly engageable with the wrapping material for folding it over the ends of the loaf.

36. In a bread wrapping machine, the combination with an endless conveyer, of a plurality of individually rotatable carriers mounted on the conveyer, mechanism to deliver bread to the carriers and to partially wrap the bread during such delivery, means engaging the wrapper during movement of the carrier to fold said wrapper over and upon the top of the bread, means to rotate the carrier during its movement, oppositely curved strips engageable with the wrapper to fold it over the ends of the bread, and oppositely curved strips engageable with the wrapper to fold it over and upon the top of the bread subsequent to a turning of the carrier.

37. In a bread wrapping machine, a horizontally traveling rotatable carrier, means to impart such movement to the carrier, means to partially wrap a loaf of bread incident to its delivery to the carrier, means engaging the wrapper during rotation of the carrier in one direction to continue the wrapping operation, and means engaging the wrapper during rotation of the carrier in the opposite direction to complete the wrapping operation, substantially as described.

38. In a bread wrapping machine, a traveling rotatable carrier, means to move the carrier in the manner stated, means to effect a first step in the wrapping operation incident to delivery of the bread onto the carrier, means to effect a second step in the wrapping operation incident to turning movement of the carrier in one direction, and means to effect a third or final step in the wrapping operation incident to a reverse rotation of the carrier, substantially as described.

39. In a bread wrapping machine, a horizontally movable and rotatable carrier, means to move and rotate the carrier, means to deliver the bread onto the carrier, means to effect a first step in the wrapping operation incident to the delivery of the bread in the manner stated, means engaging the wrapper during rotation of the carrier to effect a second step in the wrapping operation, means engaging the wrapper to effect a third and final step in the wrapping operation, means operating to apply adhesive substance to the wrapper during a wrapping operation, and means engaging the wrapper subsequent to a wrapping operation to seal the wrapper, substantially as described.

40. In means for wrapping loaves of bread, a horizontally movable and rotatable carrier, means to move the carrier, means to alternately rotate the carrier in opposite directions while horizontally moving, means to effect a first step in the wrapping operation incident to delivery of the bread onto the carrier, means engaging the wrapper to effect a second step in the wrapping operation incident to rotation of the carrier in one direction, and means engaging the wrapper to effect a third and final step in the wrapping operation incident to rotation of the carrier in the opposite direction, substantially as described.

In testimony whereof I affix my signature in presence of two witnesses.

JAMES P. NORWOOD.

Witnesses:
J. SHOOTER,
S. E. FLEMING.